United States Patent

Inoue et al.

[11] Patent Number: 5,773,145
[45] Date of Patent: Jun. 30, 1998

US005773145A

[54] POWER CABLE

[75] Inventors: Yoshiyuki Inoue; Mineya Kuno; Takeshi Fukui; Shigeki Ohsawa, all of Osaka, Japan

[73] Assignee: Sumitomo Electric Industries, Ltd., Osaka, Japan

[21] Appl. No.: 934,588

[22] Filed: Sep. 22, 1997

Related U.S. Application Data

[63] Continuation of Ser. No. 326,346, Oct. 20, 1994, abandoned, which is a continuation of Ser. No. 628,878, Dec. 18, 1990, abandoned.

[51] Int. Cl.$^6$ .............................. H01B 3/44; C08L 23/08; C08L 51/06
[52] U.S. Cl. .................. 428/389; 428/379; 428/391; 428/375; 525/72; 525/195; 525/196; 174/110 R
[58] Field of Search ..................................... 428/389, 379, 428/391, 375; 174/110 R; 525/72, 195, 196

[56] References Cited

U.S. PATENT DOCUMENTS 4,092,488  5/1978  Hayami et al. .
4,117,195  9/1978  Swarbrick et al. .
4,413,066  11/1983  Isaka et al. .
4,514,539  4/1985  Hattrich et al. .......................... 524/436

OTHER PUBLICATIONS

Chemical Abstracts, vol. 91, No. 10, abstract No. 75355g.
WPIL, File Supplier, AN–89–282044/39.
English Translation of JP–B–54–44109.

*Primary Examiner*—Kathleen Choi
*Attorney, Agent, or Firm*—Sughrue, Mion, Zinn, Macpeak & Seas, PLLC

[57] ABSTRACT

A power cable is disclosed, which comprises a conductor having thereon an insulating layer which comprises a composition comprising from 25 to 35% by weight based on the total amount of the composition of an ethylene-vinyl acetate copolymer resin having a vinyl acetate content of from 25 to 33% by weight, and from 65 to 75% by weight based on the total amount of the composition of polyethylene, the polyethylene containing in the molecule thereof vinyltrimethoxysilane by copolymerization or graft polymerization, the composition containing an organo heavy metal compound as a cross-linking catalyst, the insulating layer is cross-linked by the cross-linking reaction of trimethoxysilane groups in the polyethylene in the presence of water.

9 Claims, No Drawings

POWER CABLE

This is a continuation of application Ser. No. 08/326,346 filed Oct. 20, 1994, now abandoned, which is a file wrapper continuation of 07/628,878 filed Dec. 18, 1990 which is now abondoned.

FIELD OF THE INVENTION

The present invention relates to a solid insulated power cable, such as a cross-linked polyethylene insulated power cable, to be used for underground power transmission.

BACKGROUND OF THE INVENTION

Solid insulated power cables, particularly cross-linked polyethylene insulated power cables have been widely used as power transmission cables in place of the conventional OF cables because of ease of construction and maintenance thereof.

It is known that when solid insulated power cables are used in an atmosphere containing water, a deterioration phenomenon called water tree occurs, and they are subject to insulation breakage.

In order to prevent the above deterioration phenomenon, various methods have been proposed.

For example, JP-A-51-17588 (the term "JP-A" refers to an "unexamined published Japanese patent application") proposes the use of a composition comprising polyolefin and an ethylene-vinyl acetate copolymer added thereto as a cable insulator. JP-A-54-60346 proposes a method in which from 0.01 to 5 parts by weight of a metal salt of carboxylic acid having a carbon-carbon double bond and having not more than 24 carbon atoms is added to a cross-linked polyethylene composition.

In fact, however, no satisfactory method for preventing the deterioration phenomenon has not been obtained.

SUMMARY OF THE INVENTION

An object of the present invention is to provide a power cable which prevents formation of the water tree very effectively.

Other objects and effects of the present invention will be apparent from the following description.

It has now been found that if a composition comprising from 25 to 35% by weight of an ethylene-vinyl acetate copolymer resin containing from 25 to 33% by weight of vinyl acetate, and from 65 to 75% by weight of polyethylene, in which the polyethylene contains vinyltrimethoxy silane in the molecular chain thereof by copolymerization or graft polymerization, and the composition contains an organo heavy metal compound as a cross-linking catalyst is used as a cable insulating layer, there can be obtained a markedly long service life under power transmission in a water-dipped condition as compared with the case that a composition comprising the conventional polyethylene and the same ethylene-vinyl acetate copolymer resin as above is used.

The present invention relates to a power cable comprising a conductor having thereon an insulating layer which comprises a composition comprising from 25 to 35% by weight based on the total amount of the composition of an ethylene-vinyl acetate copolymer resin having a vinyl acetate content of from 25 to 33% by weight, and from 65 to 75% by weight based on the total amount of the composition of polyethylene, the polyethylene containing in the molecule thereof vinyltrimethoxysilane by copolymerization or graft polymerization, the composition containing an organo heavy metal compound as a cross-linking catalyst, the insulating layer is cross-linked by the cross-linking reaction of trimethoxysilane groups in the polyethylene in the presence of water.

DETAILED DESCRIPTION OF THE INVENTION

The content of vinyltrimethoxysilane in the polyethylene is preferably from 0.1 to 5% by weight, and more preferably from 0.5 to 3% by weight, based on the total amount of the polyethylene.

The melt flow rate (MFR) of the ethylene-vinyl acetate copolymer is preferably from 0.1 to 30, and more preferably from 0.3 to 5. The MFR of the polyethylene is preferably from 0.1 to 30, and more preferably from 0.3 to 5.

The ethylene-vinyl acetate copolymer and the polyethylene used in the present invention can be produced by conventional methods. For example, the ethylene-vinyl acetate copolymer can be produced by the methods described, e.g., in Stamicarbon: Neth., 6,614,767 (Apr. 19, 1968); Monsanto: B.P, 979,522 (Jan. 6, 1965); National Distillers & Chem. Corp.: Fr.P., 1,381,859 (Dec. 11, 1964); ditto: Neth., 6,605,948 (Nov. 7, 1966); ditto: Fr.P., 1,477,186 (Apr. 14, 1967); and ICI: B.P, 497,648 (1938). The polyethylene can be produced by the methods described, e.g., in JP-B-62-23777 (the term "JP-B" refers to an "examined Japanese patent publication") and JP-A-28-48540.

The ethylene-vinyl acetate copolymer used in the present invention has a vinyl acetate content of from 25 to 33% by weight, and preferably from 25 to 30% by weight.

The content of the organo heavy metal compound is preferably from 0.005 to 1% by weight, more preferably from 0.02 to 0.2% by weight, based on the total amount of the composition. Examples of the organo heavy metal compound include salts of carboxylic acids, e.g., dibutyltin dilaurate, dibutyltin diacetate, dibutyltin dioctanate, stannous acetate, stannous octanate, lead naphthenate, zinc caprylate, iron 2-ethylhexanate, cobalt naphthenate; and chelate compounds, e.g., titanic acid tetrabutyl ester, titanic acid tetranonyl ester, bis(acetylacetonitrile) diisopropyl titanate. Among these, organo tin compounds are preferably used in the present invention, and dibutyltin dilaurate, dibutyltin diacetate and dibutyltin dioctanate are more preferably used in the present invention.

It is preferred that the silane-cross-linked polyethylene contain antioxidants, from a viewpoint of mechanical characteristics for a long term use. Examples of the antioxidant include 4,4',-thiobis(6-tert-butyl-3-methyl-phenol), 2,2'-methylenebis(6-tert-butyl-4-methylphenol), dilauryl-3,3'-thiodipropionate, distearyl-3,3'-dipropionate, tetrakis (methylene-3-(3 ',5'-di-tert-butyl-4'-hydroxy-phenyl) propionate)methane, pentaerythritoltetrakis(β-laurylthiopropionate), n-octadecyl-3-(3',5'-di-tert-butyl-4'-hydroxyphenyl) propionate.

In addition, the silane-cross-linked polyethylene may contain slipping agents, such as stearic acid, zinc stearate, calcium stearate, magnesium stearate and oleic amide in an amount of from 0.01 to 1% by weight based on the total amount of the polyethylene; and carbon black in an amount of from 0.1 to 5% by weight based on the total amount of the polyethylene. Carbon black may be added as a pigment for coloring. Other pigments for coloring may also be added.

The other features of the power cable according to the present invention such as a conductor, an inner semiconductor layer, an outer semiconductor layer, an outer sheath and the like is not particularly limited, and may be produced in accordance with conventional procedures as described, e.g., in T. Hayami, CV keburu (CV Cable), published by Korona-sha, Japan, on Sep. 30, 1986.

The present invention will be described in more detail by referring to the following Example, but the present invention is not construed as being limited thereto.

EXAMPLE

Polyethylene, silane cross-linked polyethylene, an ethylene-vinyl acetate copolymer resin (abbreviated to "EVA resin"), an antioxidant (4,4'-thiobis-(6-tert-butyl 3-methylphenol)), and an organic peroxide (dicumyl peroxide) were mixed in a Banvury mixer in the formulation shown in Table 1, and pelletized.

On a copper twisted wire conductor having a cross sectional area of 38 mm$^2$, a 1 mm thick inner semiconductor layer ("NUCV-9561", ethylene-ethyl acrylate copolymer containing carbon black, organic peroxide and antioxidant, produced by Nippon Unicar Co., Ltd.), a 3 mm thick insulating layer (compositions shown in Table 1), and a 1 mm thick outer semiconductor layer ("NUCV-9561", produced by Nippon Unicar Co., Ltd.) were extruded in this order.

Then, in Comparative Examples 1 and 2, cross-linking was effected by heating with an infrared ray heater in nitrogen gas atmosphere, whereas for the other cases, cross-linking was effected by dipping for 100 hours in hot water maintained at 60° C.

For these 14 types of cables obtained, an electric voltage of AC 60 Hz and 30 kV was applied in water maintained at 60° C., and a period until insulation break down was caused was measured. The results are shown in Table 1 as relative values with the break down time of Comparative Example 1 as 1.0.

TABLE 1

| Composition | Comparative Example 1 | Comparative Example 2 | Comparative Example 3 | Example 1 | Comparative Example 4 | Example 2 | Example 3 |
|---|---|---|---|---|---|---|---|
| Polyethylene | 100 | 70 | — | — | — | — | — |
| Silane Cross-Linked Polyethylene A | — | — | 100 | 70 | — | — | 70 |
| Silane Cross-Linked Polyethylene B | — | — | — | — | 100 | 70 | — |
| EVA Resin A | — | 30 | — | 30 | — | 30 | — |
| EVA Resin B | — | — | — | — | — | — | 30 |
| EVA Resin C | — | — | — | — | — | — | — |
| EVA Resin D | — | — | — | — | — | — | — |
| EVA Resin E | — | — | — | — | — | — | — |
| Antioxidant | 0.2 | 0.2 | 0.2 | 0.2 | 0.2 | 0.2 | 0.2 |
| Organic Peroxide | 2.0 | 2.0 | — | — | — | — | — |
| Relative Service Life in Water-Dipped Condition (with that of Comparative Example 1 as 1) | 1.0 | 3.7 | 1.2 | >9.0 | 0.8 | 4.5 | 6.5 |

| Composition | Example 4 | Comparative Example 5 | Comparative Example 6 | Example 5 | Example 6 | Comparative Example 7 | Comparative Example 8 |
|---|---|---|---|---|---|---|---|
| Polyethylene | — | — | — | — | — | — | — |
| Silane Cross-Linked Polyethylene A | 70 | 70 | 70 | 75 | 65 | 85 | 55 |
| Silane Cross-Linked Polyethylene B | — | — | — | — | — | — | — |
| EVA Resin A | — | — | — | 25 | 35 | 15 | 45 |
| EVA Resin B | — | — | — | — | — | — | — |
| EVA Resin C | 30 | — | — | — | — | — | — |
| EVA Resin D | — | 30 | — | — | — | — | — |
| EVA Resin E | — | — | 30 | — | — | — | — |
| Antioxidant | 0.2 | 0.2 | 0.2 | 0.2 | 0.2 | 0.2 | 0.2 |
| Organic Peroxide | — | — | — | — | — | — | — |

TABLE 1-continued

| | | | | | | | |
|---|---|---|---|---|---|---|---|
| Relative Service Life in Water-Dipped Condition (with that of Comparative Example 1 as 1) | 7.2 | 2.3 | 3.4 | 6.2 | 7.9 | 2.4 | 4.4 |

Note:
1) Silane cross-linked polyethylene A was obtained by copolymerizing ethylene and vinyltrimethoxysilane (density = 0.924, MFR = 0.7).
Silane cross-linked polyethylene B was obtained by graft adding vinyltrimethoxysilane to polyethylene with dicumyl peroxide as a catalyst (density = 0.924, MFR = 0.7). In both cases, dibutyltin dilaurate was added as a cross-linking agent at the time of silane cross-linking.
2) Polyethylene MFR = 1.0, density = 0.92 g/cc
3) The EVA resins were as follows:
EVA resin A: vinyl acetate content = 28 wt %, MFR = 20
EVA resin B: vinyl acetate content = 25 wt %, MFR = 3
EVA resin C: vinyl acetate content = 33 wt %, MFR = 30
EVA resin D: vinyl acetate c6ntent = 19 wt %, MFR = 15
EVA resin E: vinyl acetate content = 41 wt %, MFR = 65
4) Water dipping conditions:
Hot water maintained at 60° C.
AC 60 Hz
30 kV (10 kV/mm)

It can be seen from the results of Comparative Examples 1 to 4 and Examples 1 to 2 that the power cables of the present invention have longer service lives in water-dipped conditions than those of cables with an insulating layer of a cross-linked polyethylene comprising the conventional polyethylene and EVA resin, or a silane cross-linked polyethylene alone.

Moreover, the service lives of the power cables of the present invention are obviously longer than those expected from combination of the cross-linked polyethylene with EVA resin blended thereto, and a silane cross-linked polyethylene alone. Thus, it can be understood that an unexpected result can be obtained by the present invention.

It can be seen from the results of Comparative Examples 3 and 4, and Examples 1 and 2 that the silane cross-linked polyethylene obtained by copolymerizing ethylene and vinyltrimethoxy silane and the silane cross-linked polyethylene obtained by graft polymerizing vinyltrimethoxy-silane onto polyethylene with dicumyl peroxide as a catalyst both attain superior effect of the present invention similarly to each other.

It can be seen from the results of Examples 1, 3, and 4, and Comparative Examples 5 and 6 that the markedly significant effect can be obtained by using an EVA resin having a vinyl acetate content of 25 to 33% by weight.

Moreover it can be seen from the results of Examples 1, 5 and 6, and Comparative Examples 7 and 8 that the amount of the EVA resin used is preferred to be 25 to 35% by weight based on the total amount of the composition. That is, if the EVA resin content is less than 25% by weight, or more than 35% by weight, the effect of increasing the water dipped electric application effect is decreased.

In the power cables of the present invention, the service life when electricity is passed in a water dipped condition, that is, the time until insulation break down is reached is markedly lengthened. Accordingly, the power cables of the present invention can be markedly effectively used as power cables for underground power transmission, which are often used in such conditions that there are moisture around.

While the invention has been described in detail and with reference to specific examples thereof, it will be apparent to one skilled in the art that various changes and modifications can be made therein without departing from the spirit and scope thereof.

What is claimed is:

1. A power cable comprising a conductor having thereon an insulating layer which comprises a composition comprising from 25 to 35% by weight based on the total amount of said composition of an ethylene-vinyl acetate copolymer resin having a vinyl acetate content of from 25 to 33% by weight, and from 65 to 75% by weight based on the total amount of said composition of polyethylene, said polyethylene containing in the molecule thereof vinyltrimethoxysilane by copolymerization or graft polymerization, said composition containing an organotin compound as a cross-linking catalyst, said insulating layer is cross-linked by the cross-linking reaction of trimethoxysilane groups in said polyethylene in the presence of water.

2. A power cable as claimed in claim 1, wherein said polyethylene contains said vinyltrimethoxysilane in an amount of from 0.1 to 5% by weight based on the total amount of said polyethylene.

3. A power cable as claimed in claim 2, wherein said polyethylene contains said vinyltrimethoxysilane in an amount of from 0.5 to 3% by weight based on the total amount of said polyethylene.

4. A power cable as claimed in claim 1, wherein said ethylene-vinyl acetate copolymer has a melt flow rate of from 0.1 to 30, and said polyethylene has a melt flow rate of from 0.1 to 30.

5. A power cable as claimed in claim 4, wherein said ethylene-vinyl acetate copolymer has a melt flow rate of from 0.3 to 5, and said polyethylene has a melt flow rate of from 0.3 to 5.

6. A power cable as claimed in claim 1, wherein said ethylene-vinyl acetate copolymer has a vinyl acetate content of from 25 to 30% by weight.

7. A power cable as claimed in claim 1, wherein said organo heavy metal compound is selected from the group consisting of dibutyltin dilaurate, dibutyltin diacetate and dibutyltin dioctanate.

8. A power cable as claimed in claim 1, wherein said composition contains said organotin compound in an amount of from 0.005 to 1% by weight based on the total amount of said composition.

9. A power cable as claimed in claim 8, wherein said composition contains said organotin compound in an amount of from 0.02 to 0.2% by weight based on the total amount of said composition.

* * * * *